(12) United States Patent
Ashok et al.

(10) Patent No.: US 8,180,865 B2
(45) Date of Patent: May 15, 2012

(54) SYSTEM AND METHOD FOR APPLICATION SERVER/OPERATING SYSTEM NETWORK/CONFIGURATION MANAGEMENT

(75) Inventors: Rohith Kottamangalam Ashok, Apex, NC (US); Natasha Pothen, Raleigh, NC (US); Juniarti A. Suryakusuma, Cedar Park, TX (US); Leigh Allen Williamson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 771 days.

(21) Appl. No.: 11/776,531

(22) Filed: Jul. 11, 2007

(65) Prior Publication Data

US 2009/0019108 A1    Jan. 15, 2009

(51) Int. Cl.
*G06F 15/16* (2006.01)
*G06F 15/177* (2006.01)
*G06F 9/445* (2006.01)
*G06F 11/00* (2006.01)

(52) U.S. Cl. ......... 709/221; 709/202; 709/222; 714/4.1; 717/175; 717/176

(58) Field of Classification Search .................. 709/218, 709/202, 220–222; 714/3, 4.1; 717/175, 717/176
See application file for complete search history.

(56) References Cited

U.S. PATENT DOCUMENTS

| | | | |
|---|---|---|---|
| 7,039,037 B2 * | 5/2006 | Wang et al. | 370/349 |
| 7,123,608 B1 * | 10/2006 | Scott et al. | 370/353 |
| 2002/0091814 A1 * | 7/2002 | Arendt et al. | 709/223 |
| 2002/0099829 A1 * | 7/2002 | Richards et al. | 709/227 |
| 2002/0188538 A1 * | 12/2002 | Robertson et al. | 705/35 |
| 2003/0004744 A1 * | 1/2003 | Greene et al. | 705/1 |
| 2003/0120502 A1 * | 6/2003 | Robb et al. | 705/1 |
| 2003/0214525 A1 * | 11/2003 | Esfahany | 345/700 |
| 2006/0034237 A1 * | 2/2006 | Patrick et al. | 370/338 |
| 2006/0248194 A1 * | 11/2006 | Ly et al. | 709/226 |
| 2007/0058792 A1 * | 3/2007 | Chaudhari et al. | 379/88.17 |
| 2007/0130566 A1 * | 6/2007 | van Rietschote et al. | 718/1 |
| 2007/0168495 A1 * | 7/2007 | Rothstein et al. | 709/224 |
| 2008/0071728 A1 * | 3/2008 | Lim | 707/1 |
| 2008/0133300 A1 * | 6/2008 | Jalinous | 705/7 |
| 2008/0320113 A1 * | 12/2008 | Arendt et al. | 709/220 |
| 2009/0019108 A1 * | 1/2009 | Ashok et al. | 709/203 |

* cited by examiner

*Primary Examiner* — Patrice Winder
*Assistant Examiner* — Ebrahim Golabbakhsh
(74) *Attorney, Agent, or Firm* — Lee Law, PLLC; Christopher B. Lee

(57) ABSTRACT

The invention discloses a system and method for network application server/operating system management by packaging configuration function(s) into independently partitioned profiles (or "silos") that can be dynamically invoked by an "administrative agent" server/program using a "proxy server"/program to distribute profile configuration changes to one or more administrative agents (each of which is assigned one or more application servers/systems).

12 Claims, 5 Drawing Sheets

SYSTEM AND METHOD FOR APPLICATION SERVER/OPERATING SYSTEM NETWORK/CONFIGURATION MANAGEMENT

TECHNICAL FIELD

The invention relates to computer programming to accomplish application server/operating system network/configuration management.

BACKGROUND

The client/server model of distributed computing operates to fulfill user needs by splitting functions between "client" tasks and "server" tasks performed by various computer hardware and software resources that are organized into a "network" for communication with each other, such as a local area network ("LAN") or a wide area network ("WAN") or the Internet. Using this model, a "client" program sends message requests to a "server" program in order to obtain data and/or processing action according to some communication "protocol" (i.e., a set of standard rules that determine how information is transmitted across a network) and the server completes the processing transaction by carrying out the request (or deferring it to another time or by indicating that it cannot be fulfilled). This model allows clients and servers to be located (and to operate) independently of each other in a computer network, often using different hardware and operating systems appropriate to the function of each. A "proxy server (or gateway)" is often used in handling client requests for transactions to be completed by other network "application servers" which are capable of (either directly or managing the operation of other application programs in) performing the data processing actions required for the transaction but are not accessed directly by the client. When a proxy server receives a message from a user client requesting access to a particular application server in order to process such a transaction, the proxy server searches for the "call ID" (or address) identifying the network location of the requested application server and (if found) forwards the message to that server for action.

Many current application server models provide for a "single server" configuration that serves the dual purposes of managing (or "hosting") user-installed computer software application programs as well as the administrative capabilities (in performing the configuration and "runtime" tasks) necessary to allow the server to operate the hardware/software (including network/internet) components of the computer system. In so doing, the server may possess the ability to change its operating configuration (as well as modify its own execution or "runtime" state) via use of programs such as Java Management extensions (JMX MBeans) while also hosting the program code needed for implementation of an "administrative console" application as well as to allow interpreted (such as those programmed using Java or any other suitable programming language) scripts to execute on the server. However, since the server can host only its own administration capabilities in such a model, any other server(s) configured for use with the system or network must also host its/their own administrative functions (as there is no current "safe" mechanism for such servers to administer the operation of each other).

It has been discovered (from experience) that the administrative tasks of the server have overtaken its primary purpose of hosting user applications, requiring a new system programming architecture allowing a separate (dedicated) "administrative agent server" to manage the operation of "base" application server(s) (in order to allow them to accomplish the task of hosting installed user applications). However, while the agent is a custom-programmed administrative server model (that allows the application server to fulfill this primary task) it has been considered to be an unnecessary proliferation of some (such as certain Java) executed processes, since a separate administrative agent is needed for each application server operating configuration (or "profile") where multiple profiles can exist for use within a single system or network (each for use with one or more application servers).

The invention seeks to resolve this problem by providing a server management architecture previously missing from such systems, where the administrative code (i.e., the "profile") needed to run an application server configuration can be viewed as a "silo" that can be individually executed irrespective of the processing state of other such similar "silos". In so doing, a single administrative agent can now be used for managing multiple application server profiles (whereas previously one agent was required per profile). However, such a system design introduces "scalability" and "single point of failure" problems, such that if an agent (administering multiple application server profiles) ceases operation (for any reason) then all of its administrative functions (for the profiles managed) are lost until that agent is restored to operating status. In order to solve this problem on distributed client/server network platforms, the invention provides an "administrative proxy server" model to "load-balance" the management of application server configuration profile "silos" among administrative agent servers (as described below).

SUMMARY OF THE INVENTION

The invention provides for packaging (or "wrapping") of computer system/network application server/operating system management/configuration function(s) into independently partitioned profiles (or "silos") that can be dynamically invoked by an "administrative agent" server/program through use of a "proxy server"/program that distributes profile configuration changes to one or more administrative agents (each of which is assigned one or more application servers/systems). Using such a technique, all of the administrative function(s) of an application server/system operating configuration/profile can be executed using a single (proxy server) "entry point" to provide management for the profile through issuance of command(s). Use of such a model provides reduced processing cost (and high user availability) since the management of each application server program configuration profile can be independently (and portably) isolated to allow multiple "silos" to be managed by a single administrative agent.

It is therefore an object of the present invention to provide computer system/network management by packaging application server/operating system configuration function(s) into independent profiles invoked by an "administrative agent" using a "proxy server" to distribute profile configuration changes to one or more such agents (each with one or more assigned application servers/systems).

It is another object of the present invention to provide for dynamic client/server network management by allowing a proxy server to distribute updated profile(s) of the operating configuration(s) of network application server(s) to administrative server(s) assigned to an application server.

The subject matter which is regarded as the invention is particularly pointed out and distinctly claimed in the concluding portion of the specification. The invention, however, together with further objects and advantages thereof, may

BRIEF DESCRIPTION OF THE DETAILED DRAWINGS

DETAILED DESCRIPTION OF THE PREFERRED EMBODIMENTS

Figure 1:
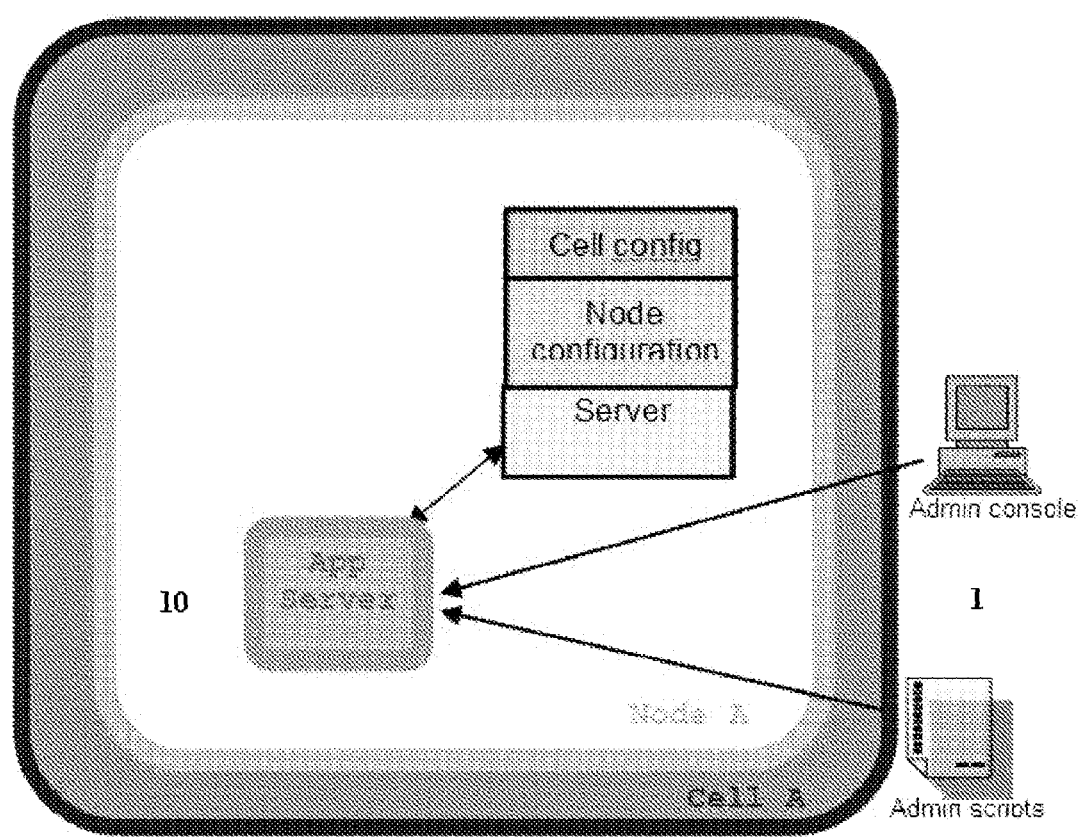
FIG. 1 illustrates a diagram outlining operation of a prior art application client/server network.
Figure 2:
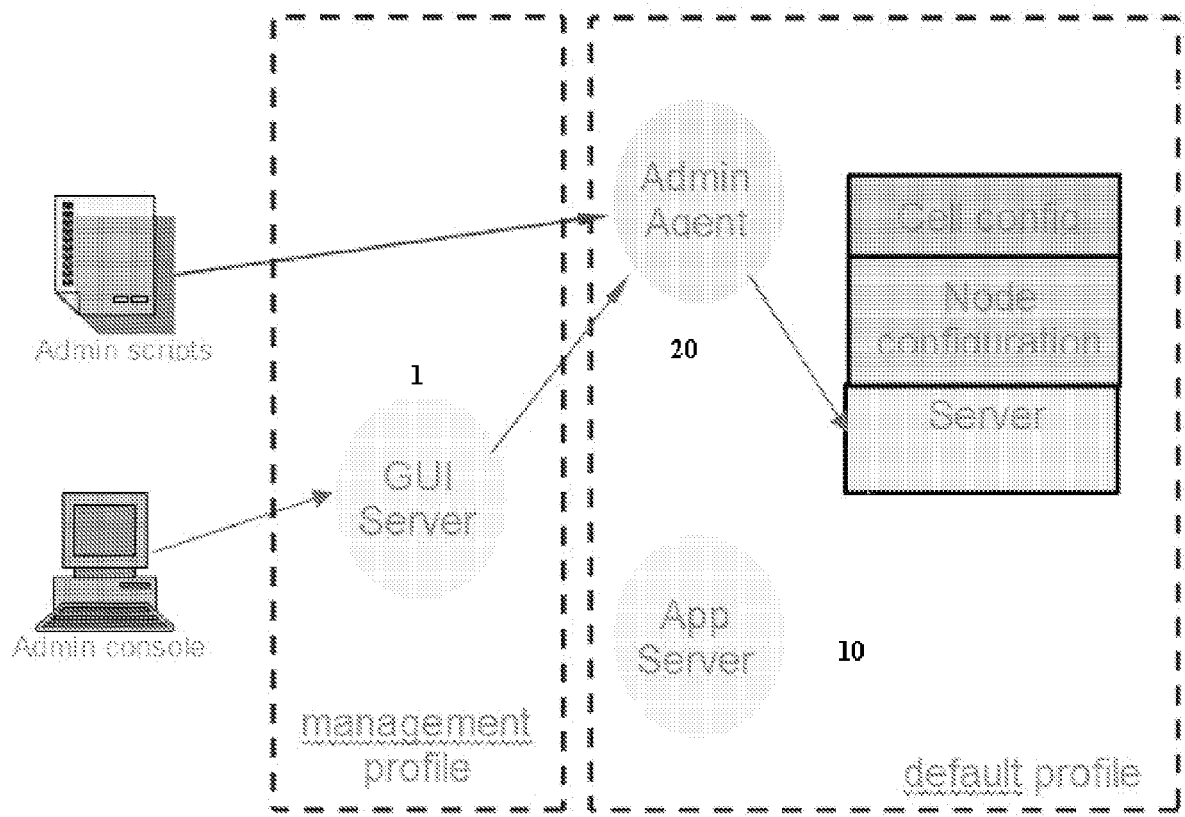
FIG. 2 illustrates a diagram outlining operation of a prior art application client/server network using an administrative server.

FIG. 1 illustrates a diagram outlining operation of a prior art application client/server network, while FIG. 2 illustrates such a network using a dedicated administrative server (or "AdminAgent") 20 to manage the operating configuration of one or more "base" application server(s) 10 (in order to allow them to accomplish the task of hosting installed user client applications 1). As shown in FIG. 2 and explained above, such a prior art system utilizes a separate AdminAgent to manage each application server "profile" (even in cases where multiple profiles exist within a single system or network).

Figure 3:
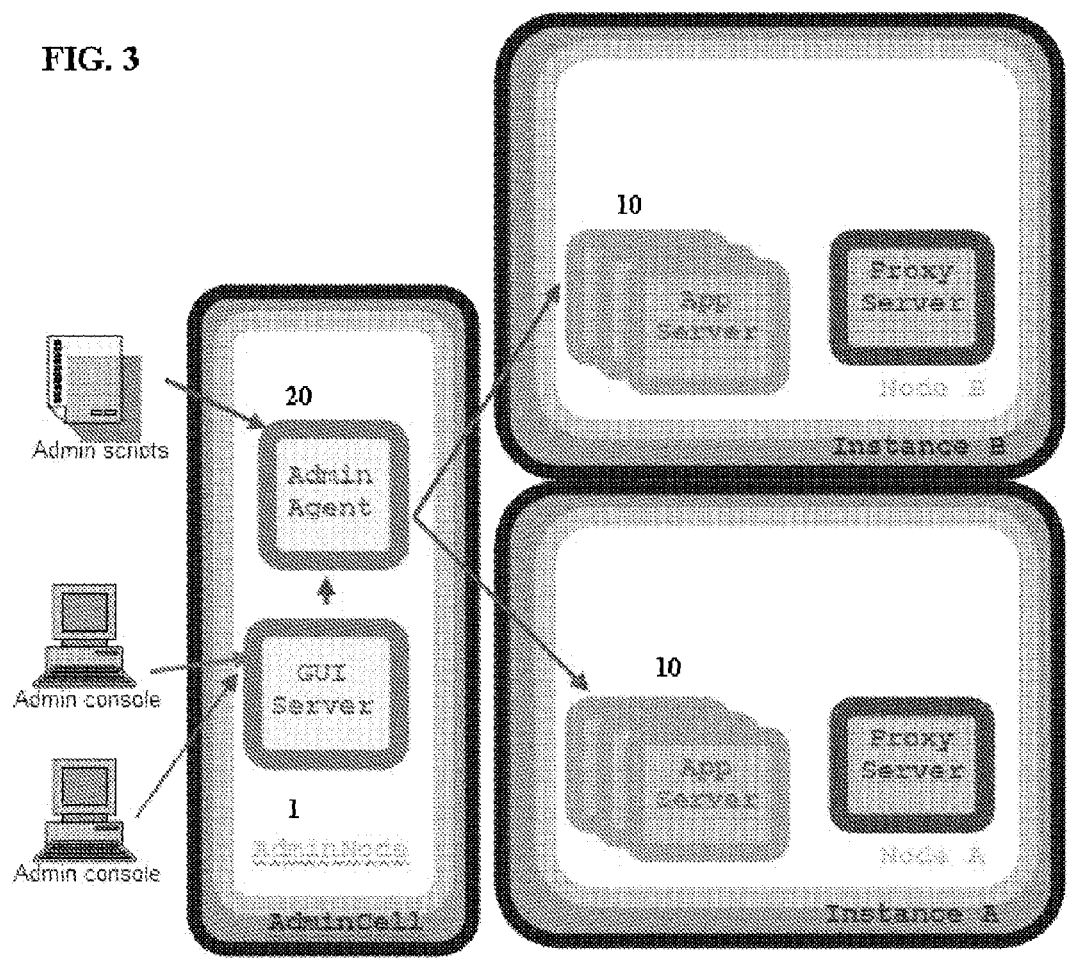
FIG. 3 illustrates a diagram outlining operation of an application client/server network using an administrative server according to the invention.

As shown in FIG. 3 and explained above, a preferred embodiment of the invention provides a server management architecture where the "administrative code profile" needed to manage an application server operating configuration can be viewed as a "silo" that can be individually (and independently) processed (i.e., "started" and "stopped") irrespective of the state of other similar hosted "silos". This is accomplished through establishment of two (2) or some other (pre) defined number of external hardware communication (such as JMX) ports that are used to uniquely identify those management "silo(s)"/"profiles" in operation at a given point in time. In so doing, a single AdminAgent 20 can be used for managing multiple application server profiles 10 (instead of one AdminAgent per profile).

Figure 4:
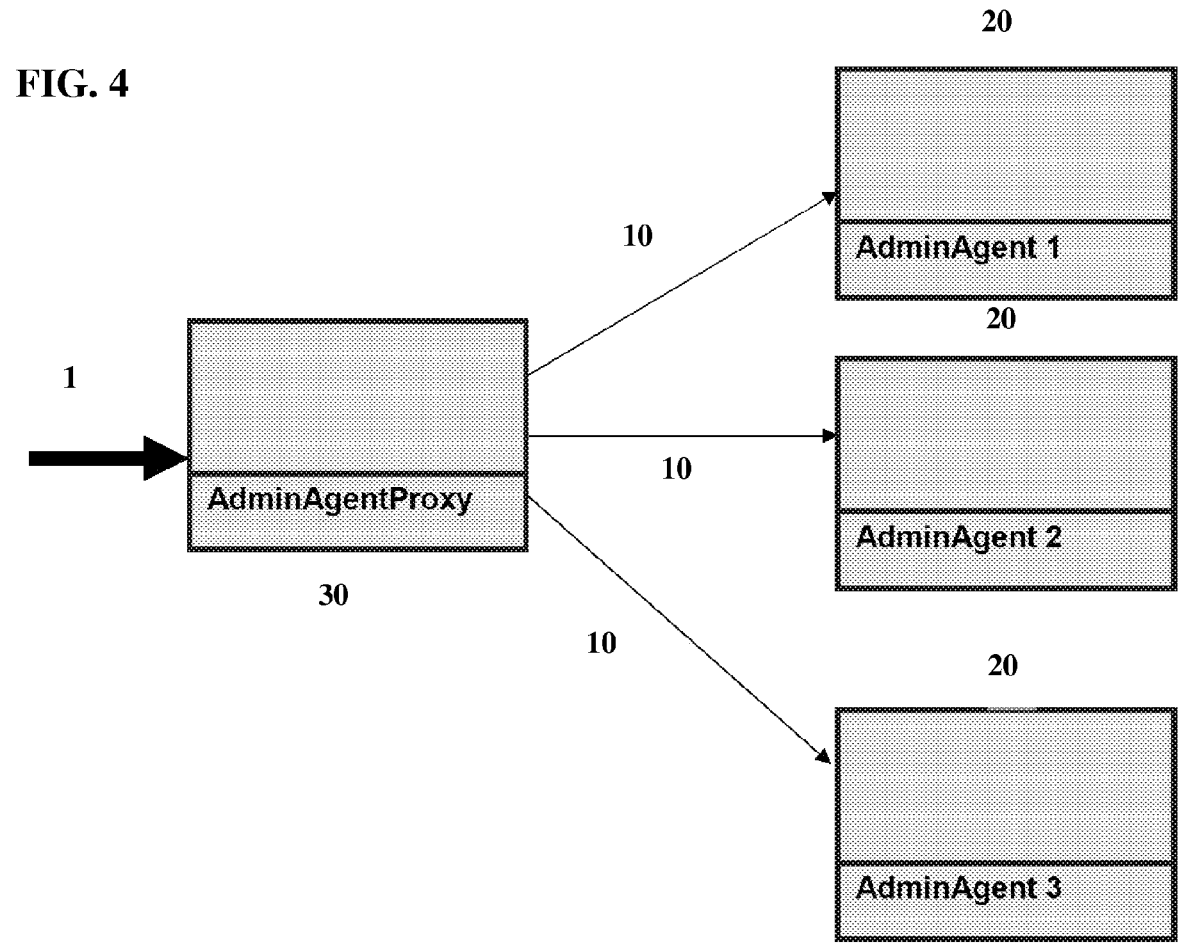
FIG. 4 illustrates a diagram outlining operation of an application client/server network using an administrative/proxy server configuration according to the invention.

In order to resolve the "scalability" and "single point of failure" problems described above, the system of FIG. 3 can be modified as shown in FIG. 4, where a JMX administrative proxy server ("AdminAgentProxy") 30 is used to distribute application server program configuration profile "silo(s)" 10 between AdminAgent servers 20. In the example of FIG. 4, an AdminAgentProxy and its three (3) assigned AdminAgents can manage six (6) application server profile(s) using the following predefined port configurations:

| AdminAgent 1: | Profile 1 (port 2001) | Profile 2 (port 2002) |
| AdminAgent 2: | Profile 3 (port 2003) | Profile 4 (port 2004) |
| AdminAgent 3: | Profile 5 (port 2005) | Profile 6 (port 2006) |

In that case, the AdminAgentProxy 30 is configured to act as the main server connection point (by opening all ports 2001→2006) such that any client(s) 1 seeking use of application server 10 management capabilities/functions must connect to this proxy server (which in turn forwards each such user client request to the correct AdminAgent 20).

By using this configuration in a situation where an administrative server (such as for example AdminAgent 3) ceases operation, only a subset of the total number (in this case two) application server profiles are lost (since the administrative workload is distributed among multiple agents). In addition, the management of application server "Profile 5" and "Profile 6" (previously handled by AdminAgent 3) can be restarted on any of the remaining AdminAgent servers (where the AdminAgentProxy detects the failure of AdminAgent 3 and then automatically re-distributes its management functions to remaining AdminAgent(s)) since the system is "siloed" into independently partitioned profiles. In a situation where the AdminAgentProxy itself ceases operation, the AdminAgents can each operate their own respective management profile/port configuration(s) in place of the proxy server (until it is restarted whereupon it will resume its normal functions) since identification of the ports has been predefined (as described above).

Figure 5:
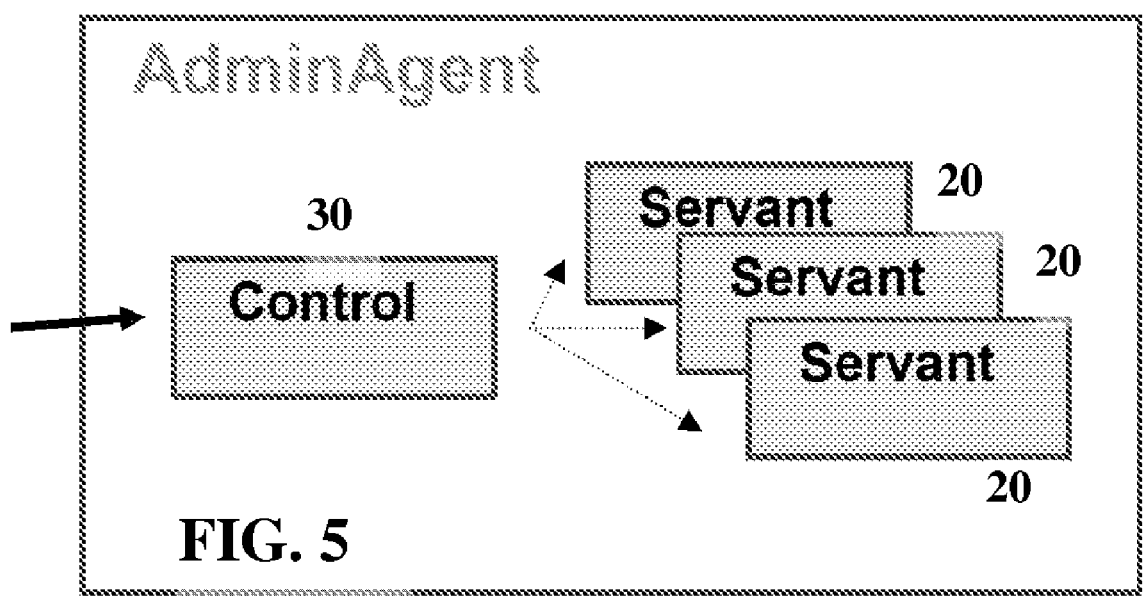
FIG. 5 illustrates a diagram outlining a computer operating system using administrative/proxy service function(s) according to the invention.

In addition to the proxy server model described above, a split process control model can be implemented to use available computer operating system (such as IBM z/OS®) functions, by use of a "hybrid server" configuration involving a combination of Java Virtual Machine process(ors) (JVMs). In such a system as shown in FIG. 5, a "single endpoint" or "control region" JVM (functioning in a manner similar to the proxy server 30 described above) serves to distribute JMX administrative function calls to associated "backend" administrative "servant regions" (that operate in a manner similar to the AdminAgent servers 20 described above) where a servant region can be started and/or stopped dynamically in response to changes in processing workload for its assigned application servers.

While certain preferred features of the invention have been shown by way of illustration, many modifications and changes can be made that fall within the true spirit of the invention as embodied in the following claims, which are to be interpreted as broadly as the law permits to cover the full scope of the invention, including all equivalents thereto.

What is claimed is:

1. A computer system, comprising:
   a network communication component; and
   an administrative proxy server device configured to:
   distribute, via the network communication component, at least one of a plurality of independent partitioned application server program configuration profiles to each of a plurality of application servers;
   independently start each of the independent partitioned application server program configuration profiles distributed to each of the plurality of application servers;
   detect a failure associated with one of the plurality of application servers;
   automatically re-distribute the at least one of the plurality of independent partitioned application server program configuration profiles distributed to the failed one of the plurality of application servers to at least one remaining application server of the plurality of application servers;
   restart the re-distributed at least one of the plurality of independent partitioned application server program configuration profiles at the at least one remaining application server of the plurality of application servers; and
   wherein the administrative proxy server device is further configured to redistribute management of the re-distributed at least one of the plurality of independent partitioned application server program configuration profiles to at least one remaining administrative server upon a failure of an assigned administrative server.

2. The system of claim 1 wherein the administrative proxy server device is further configured to define a number of communication ports, each uniquely identifying at least one of the distributed independent partitioned application server program configuration profiles.

3. The system of claim 2 further comprising an administrative server that operates its own profile/port configuration(s) upon failure of a proxy server associated with one of the plurality of application servers.

4. The system of claim 1 wherein the plurality of application servers comprise Java Virtual Machines.

5. The system of claim 4 wherein each of the plurality of application servers is configured to change an operating configuration using at least one Java management extension.

6. The computer system of claim 1, further comprising:
at least one user client;
at least one proxy server;
at least one application server;
at least one administrative server;
wherein: each of the at least one user client is configured to transmit one of the independent partitioned application server program configuration profiles using one of the at least one proxy server;
each of the at least one proxy server is configured to forward the independent partitioned application server program configuration profiles from the at least one user client to an administrative server of the at least one administrative server assigned to one of the at least one application server used by the at least one user client;
each of the at least one administrative server is configured to process at least one of the independent partitioned application server program configuration profiles containing an operating configuration for at least one application program used by at least one of the at least one user client under control of the at least one application server; and
each of the at least one application server is assigned to one of the at least one administrative server and configured to control at least one of the at least one application program according to the independent partitioned application server program configuration profiles used by the at least one user client.

7. A method, comprising:
distributing, via an administrative proxy server device, at least one of a plurality of independent partitioned application server program configuration profiles to each of a plurality of application servers;
independently starting each of the independent partitioned application server program configuration profiles distributed to each of the plurality of application servers;
detecting a failure associated with one of the plurality of application servers;
automatically re-distributing the at least one of the plurality of independent partitioned application server program configuration profiles distributed to the failed one of the plurality of application servers to at least one remaining application server of the plurality of application servers;
restarting the re-distributed at least one of the plurality of independent partitioned application server program configuration profiles at the at least one remaining application server of the plurality of application servers; and
redistributing management of the re-distributed at least one of the plurality of independent partitioned application server program configuration profiles to at least one remaining administrative server upon a failure of an assigned administrative server.

8. The method of claim 7 further comprising defining a number of communication ports, each uniquely identifying at least one of the distributed independent partitioned application server program configuration profiles.

9. The method of claim 8 wherein an administrative server operates its own profile/port configuration(s) upon failure of a proxy server associated with one of the plurality of application servers.

10. The method of claim 7 wherein the plurality of application servers comprise Java Virtual Machines.

11. The method of claim 10 wherein each of the plurality of application servers is configured to change an operating configuration using at least one Java management extension.

12. The method of claim 7, further comprising:
configuring at least one user client to transmit one of the independent partitioned application server program configuration profiles using at least one proxy server;
configuring the at least one proxy server to forward the independent partitioned application server program configuration profiles from the at least one user client to an administrative server of at least one administrative server assigned to at least one application server used by the at least one user client;
configuring at least one administrative server to process at least one of the independent partitioned application server program configuration profiles containing an operating configuration for at least one application program used by at least one of the at least one user client under control of the at least one application server; and
configuring the at least one application server assigned to one of the at least one administrative server to control at least one of the at least one application program according to the independent partitioned application server program configuration profiles used by the at least one user client.

* * * * *